United States Patent
Cheung et al.

(10) Patent No.: US 6,970,951 B2
(45) Date of Patent: Nov. 29, 2005

(54) METHOD AND DEVICE FOR PROVIDING AND EXTERNAL INTERFACE USING A PROGRAMMED CONFIGURATION BIT IN FLASH MEMORY

(75) Inventors: Hugo Cheung, Tucson, AZ (US); Terence Chiu, Tucson, AZ (US); Lu Yuan, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 553 days.

(21) Appl. No.: 09/968,885

(22) Filed: Oct. 2, 2001

(65) Prior Publication Data

US 2003/0065831 A1 Apr. 3, 2003

Related U.S. Application Data

(60) Provisional application No. 60/289,011, filed on May 4, 2001.

(51) Int. Cl.[7] .................................................. G06F 3/00

(52) U.S. Cl. .............................. 710/14; 710/3; 710/5; 710/38

(58) Field of Search .............................. 710/2, 3, 5, 8, 710/14, 33, 11, 18, 101, 104; 713/1, 100; 709/221; 712/229

(56) References Cited

U.S. PATENT DOCUMENTS

| | | | | |
|---|---|---|---|---|
| 5,608,876 A | * | 3/1997 | Cohen et al. | 710/101 |
| 5,635,856 A | * | 6/1997 | Raza et al. | 326/38 |
| 5,677,885 A | * | 10/1997 | Roohparvar | 365/201 |
| 6,073,167 A | | 6/2000 | Poulton et al. | |
| 6,134,167 A | | 10/2000 | Atkinson | |
| 6,199,128 B1 | | 3/2001 | Sarat | |
| 6,208,163 B1 | * | 3/2001 | Wittig et al. | 326/39 |
| 6,556,497 B2 | * | 4/2003 | Cowles et al. | 365/222 |
| 6,581,122 B1 | * | 6/2003 | Sarat | 710/301 |

* cited by examiner

*Primary Examiner*—Jeffrey Gaffin
*Assistant Examiner*—Alan S Chen
(74) *Attorney, Agent, or Firm*—W. Daniel Swayze, Jr.; W. James Brady; Frederick J. Telecky, Jr.

(57) ABSTRACT

An external interface for a microprocessor system uses a programmed configuration bit to establish the functionality of a computer port, which improves external interface data transfer speed and input/output power consumption. In particular, the configuration bit allows the microprocessor user to establish the computer port as a memory port, input/output port or the like. The configuration bit is provided to the computer port at system power up or reset. Moreover, the configuration bit may be stored in flash memory and provided to the microprocessor computer port or, in the alternative, the configuration bit may be provided to the computer port directly via the microprocessor bus interface.

6 Claims, 3 Drawing Sheets

METHOD AND DEVICE FOR PROVIDING AND EXTERNAL INTERFACE USING A PROGRAMMED CONFIGURATION BIT IN FLASH MEMORY

CROSS-REFERENCE TO RELATED APPLICATION

This application claims priority from U.S. Provisional patent application Ser. No. 60/289,011, filed May 4, 2001.

FIELD OF THE INVENTION

The present invention relates to a external memory interface system for use with microcontroller-based products. More particularly, the present invention relates to a method to facilitate the transfer of data to an external device using a programmable flash memory configuration bit.

BACKGROUND OF THE INVENTION

The demand for higher performance, microcontroller-based products for use in communication and processing applications continues to increase rapidly. As a result, microcontroller-based product manufacturers are requiring for the components and devices within these products to be continually improved to meet the design requirements of a myriad of emerging audio, video and imaging applications.

These microcontroller-based products use various types of processors, for example, general purpose microprocessors for controlling the logic of various digital devices, such as clock radios, microwave ovens, digital video recorders and the like, and special purpose microprocessors, such as math coprocessors for mathematical computations, or digital signal processors used in manipulating various types of information, including sound, imaging and video information.

The microcontroller typically includes a central processing unit (CPU) core for the processing functions, and a bus interface for communication with the various memory devices as well as external or other peripheral devices.

For the transmitting and receiving of data between various devices and components, microprocessors and other devices utilize various types of serial interfaces. One such type of interface definition typically used is the serial peripheral interface (SPI). In addition, for the temporary storage of data, for example, to permit the microprocessors to manipulate the data before transferring the data through the SPI to another device, the microprocessors generally utilize one or more buffers. These buffers are configured with the SPI's to enable the processors to transmit and receive data to and from the buffers as needed in an application.

For the storage of data, the microprocessor can include various types of memory. For example, the CPU for the microcontroller may include Random Access Memory (RAM) as well as Read-Only Memory (ROM), i.e., programmed memory. In addition, the microcontroller can also include flash memory which can be erased and preprogrammed in blocks instead of being programmed one byte at a time.

In a typical microprocessor system arrangement, the microprocessor may include various conventional port structures for connecting to peripheral devices, such as, I/O devices, memory devices, and the like. Accordingly, each port function (e.g., mode) may be identified by a pull-up resistor with relation to the port output pin. Various port arrangements and pull-up resistor positions are well known in the art. For examples of conventional port arrangements and port modes, please see U.S. Pat. No. 6,199,128 issued to Sarat on Mar. 3, 2001, U.S. Pat. No. 6,134,167 issued to Atkinson on Oct. 17, 2000 and U.S. Pat. No. 6,073,167 issued to Murray, et al. on Jun. 6, 2000.

In low speed I/O implementations, a pull-up resistor is typically connected to an output pin. These pull-up resistors, however, are often characterized by speed versus power limitations. In particular, if the pull-up resistance is high, the current is low and the CPU clock speed is slow, which results in low static power. On the other hand, if the pull-up resistance is low, the CPU clock speed is high, but power is generally sacrificed.

Further, in existing high-speed I/O implementations, power dissipation can be reduced through the use of different pull-up strengths at different machine cycle times. For example, where four machine cycles exist (e.g., C1, C2, C3, C4), and the memory access mode occurs with respect to machine cycle C1, then a weak pull-up resistance is used for C1 and a strong pull-up resistance is used for machine cycles C2–C4. In this case, high power dissipation will only occur with respect to C1, when processing speed is most critical. It is important to note, however, the overall CPU processing speed is still diminished by the I/O speed which occurs with respect to C2–C4.

Accordingly, a need exists for an improved external memory interface system which does not compromise between high speed and low power in I/O when the device is in memory mode. Further, a need exists for such a system to include no additional configuration pins, and therefore not resulting in an increase in the cost of the overall system.

SUMMARY OF THE INVENTION

The external memory interface system according to the present invention addresses many of the shortcomings of the prior art. In accordance with various aspects of the present invention, an improved interface system is provided which uses existing computer architecture to improve the external interface data transfer speed and, in addition, reduce I/O power consumption.

In accordance with one aspect of the present invention, a configuration bit may be programmed in flash memory for establishing the functionality of a computer port. The programming of the configuration bit may be configured depending on whether the computer port is to be used to facilitate the driving of an I/0 device or a memory unit.

In accordance with one exemplary embodiment of the present invention, the configuration bit is stored in a register within the computer flash memory. The configuration bit is provided to the computer port at power up or system reset.

In accordance with another exemplary embodiment of the present invention, the configuration bit may be provided to the port directly via a computer interface.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and;

DETAILED DESCRIPTION OF EXEMPLARY EMBODIMENTS OF THE INVENTION

The present invention may be described herein in terms of various functional components and various processing steps. It should be appreciated that such functional components may be realized by any number of hardware or structural components configured to perform the specified functions. For example, the present invention may employ various integrated components, e.g., buffers, voltage and current references, memory components and the like, comprised of various electrical devices, e.g., resistors, transistors, capacitors, diodes or other devices, whose values may be suitably configured for various intended purposes. In addition, the present invention may be practiced in any microcontroller-based application. Such general applications that may be appreciated by those skilled in the art in light of the present disclosure are not described in detail herein. However for purposes of illustration only, exemplary embodiments of the present invention will be described herein in connection with a microcontroller. Further, it should be noted that while various components may be suitably coupled or connected to other components within exemplary circuits, such connections and couplings can be realized by direct connection between components, or by connection through other components and devices located therebetween.

Figure 1:
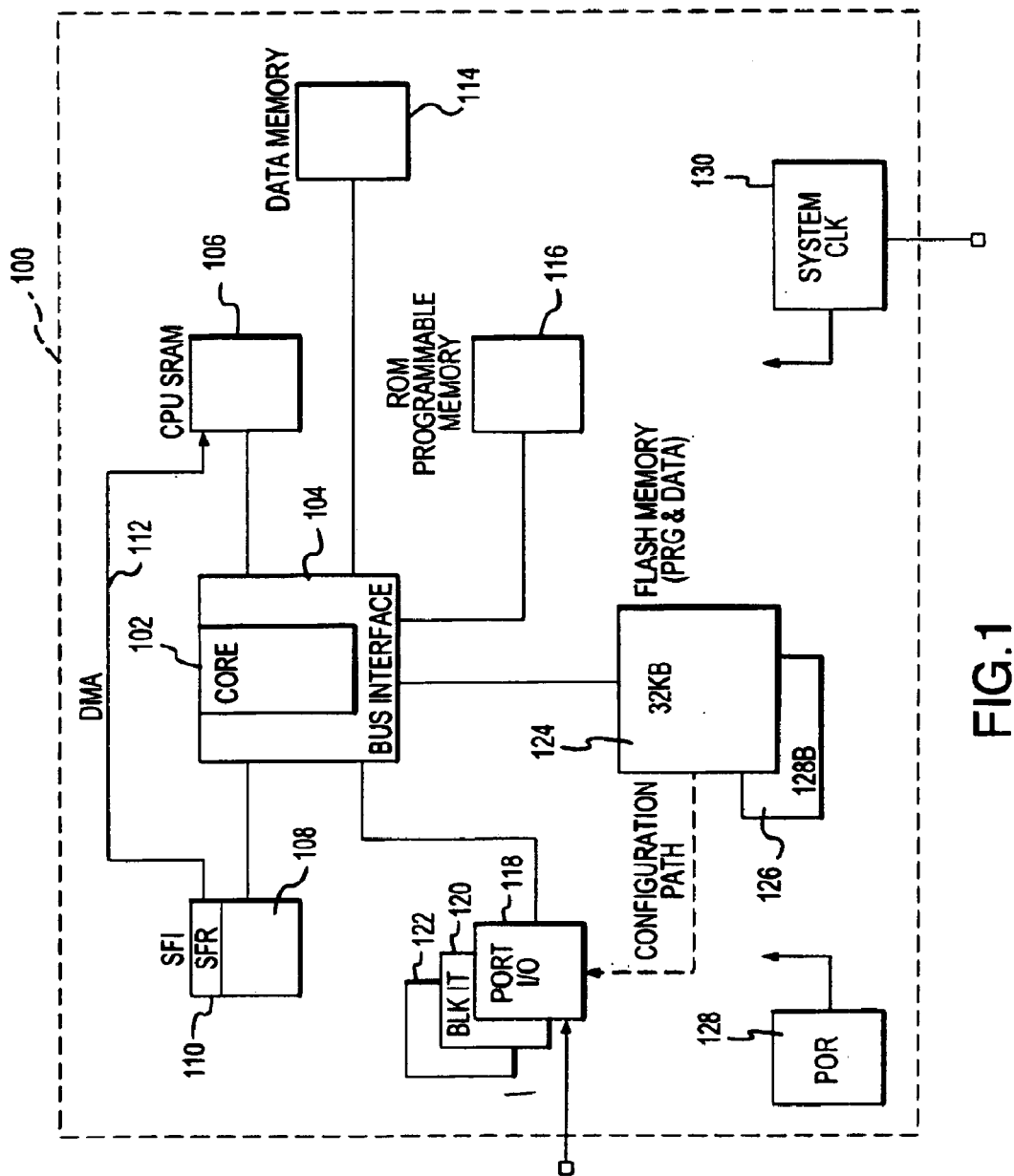
FIG. 1 illustrates a block diagram of an exemplary microcontroller in accordance with an exemplary embodiment of the present invention.

With reference to FIG. 1, an exemplary microcontroller 100 is illustrated. Microcontroller 100 suitably comprises a central processing unit (CPU) core 102 configured for the processing of data, and a bus interface 104 for communication with the various memory or input and output devices. For the storage of data, microcontroller 100 can comprise various types of memory. For example, microcontroller 100 can comprise an internal CPU static random access memory (SRAM) 106 which can provide very low access time, e.g., as low as 10 nanoseconds. In addition, microcontroller 100 can also include data memory 114 which can also comprise SRAM-type memory, and read-only memory (ROM) 116 which can comprise the programmable memory for the microcontroller 100. Still further, microcontroller 100 can also include flash memory for the programming and storage of data, such as a large page of memory 124 comprising, for example, 32 kilobytes of data storage, as well as a smaller configuration of flash memory 126, comprising, for example, 128 bytes. For the transmitting and receiving of data between various components, microprocesser 100 can also comprise serial peripheral interface (SPI) 110 which can communicate with the CPU memory 106 via direct memory access (DMA) 112, i.e., SPI 108 can transfer data from main memory to a device without passing the data through the CPU.

In addition, the microcontroller can also include various input output devices. For example, an I/O port device 118 can be provided, as well as a breakpoint device 120. Further, microcontroller 100 can also include a system clock 130 for providing clock cycles for triggering various functions and sequences during operation. Microcontroller 100 can also include a Power On Reset (POR) 128 for use during ramping up of a power supply.

As discussed above, previous attempts for providing an external memory interface with speed enhancement and I/O power reduction have resulted in microcontroller systems wherein the CPU speed remains slow because of the speed versus power limitations of the pull-up resistors used in conventional I/O implementations. However, in accordance with various aspects of the present invention, a configurable bit can be used which configures a computer system port to operate in either memory mode (e.g., no pull-up resistor) or register I/O mode (weak pull-up resistor). By including the configuration bit in the manner described below, the propagation speed and the I/O power consumption of the external memory interface may be reduced.

In accordance with an exemplary embodiment of the present invention, the configurable bit may be stored in programmable flash memory, and additionally, is capable of alteration and retention even during power down.

With reference to FIG. 1, an exemplary embodiment of the invention is illustrated. It should be noted that the microprocessor system 100 may be realized by any number of hardware or software components configured to perform the specified functions. For example, the present invention may employ various integrated circuit components, e.g., memory elements, digital signal processing elements, logic elements, look-up tables, and the like which may carry out a variety of functions under the control of one or more microprocessors, microcontrollers or other control devices. In addition, those skilled in the art will appreciate that the present invention may be practiced in conjunction with any number of external memory interface management systems, wherein it may be necessary to communicate to various external memory units, such as, for example, Dynamic Random Access Memory ("DRAM"), Static Access Memory ("SRAM"), external Flash Memory, Read only memory ("ROM"), Random Access Memory ("RAM"), and the like. In addition, those skilled in the art will appreciate that the present invention may be practiced in any number of microprocessing or data processing contexts wherein it may be necessary to transfer data to and from an external memory unit and, therefore, the exemplary embodiment relating to the microprocessing of data as described herein is merely one exemplary application for the invention.

As noted above, in low speed I/O implementations, a pull-up resistor (not shown) is typically connected to the output pin of a computer port, such as, for example, computer port 118. In accordance with the exemplary embodiment, a configurable bit is stored inside the flash memory 124 and may be accessed by bus interface 102. The configurable bit may be programmed in the flash memory 124, depending on whether computer port 118 is to be used to facilitate the driving of a I/O device or memory unit. For example, the configuration bit may be programmed to be high or "1," which in turn may establish that the port 118 (or 120, 122 variously) is to be connected to an I/O device. On the other hand, the configuration bit may be programmed to be low or "0" for establishing that port 118 is to be connected to a memory device.

Further, the configuration bit may be pre-programmed by the manufacturer of the microprocessor system 100 prior to delivery to an end user. Alternatively, the configuration bit may be programmed by the end-user upon receipt of the microprocessor system 100. Further still, the configuration bit may be variably programmed, or set in various purpose modes which identify the purpose for which port 118 may be used (e.g., I/O mode or memory mode, etc.).

Figure 2:
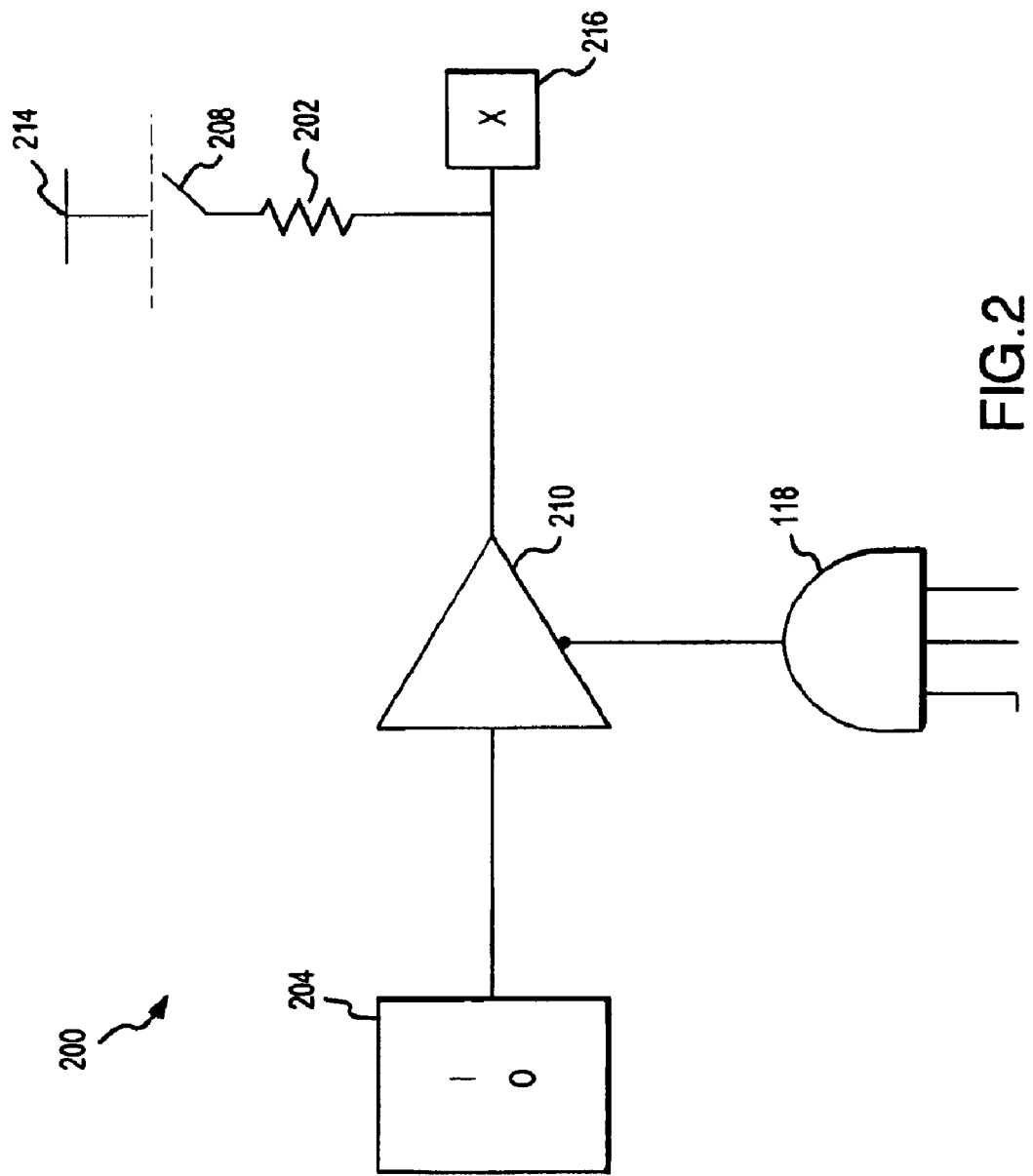
FIG. 2 is a schematic block diagram of exemplary port arrangement for use with the present invention.

The operation of the present invention may be described in accordance with both FIGS. 1 and 2. In accordance with an exemplary embodiment of this invention, the configuration bit may be read from flash memory 124 or 126 during power up and/or at reset of the microprocessor system 100, and stored in a register (204). Additionally, the configuration bit may be provided to port 118 directly using an appropriate command provided via bus interface 104.

With reference to FIG. 2, an exemplary port arrangement 200 is shown. In accordance with this exemplary embodiment, port arrangement 200 includes power source 214 connected via switch 208 to a pull-up resistor 202. Pull-up resistor 202 is connected to an output pin 216, and further connected to register 204 inside flash memory 124 via tri-state buffer 210. Tri-state buffer 210 is further connected to computer port 118 for providing the value stored in register 204 and establishing the computer port 118 operational mode. In accordance with this exemplary embodiment, the flash memory 124, the register 204, tri-state buffer 210, pull-up resistor 202, switch 208, output pin 216, power source 214 and computer port 118 may be of any conventional construction suitable for use in a microprocessor system, and are well known in the microprocessor art. Consequently, their descriptions will not be given here for brevity. Additionally, it should be noted that port arrangement 200 of FIG. 2 is included for illustrative purposes, and it should be understood that other port arrangements are suitable for use and as such, are intended to be included in the scope of the present invention.

To understand the various operational modes of the port arrangement 200, the following description is provided. Although the following description is made relative to port 118, one skilled in the art will understand that the description is suitable for ports 120 and 122, variously. For example, where the configuration bit is set in flash memory 124 such that port 118 will be used as a I/O port, switch 208 may be closed such that the power source 214 may be connected to the output pin 206 of port 118 via the pull-up resistor 202. On the other hand, where the configuration bit is set such that the port 118 will be used for driving an external memory unit, the switch 208 may be open such that the pull-up resistor 202 may be disconnected from the power source 214 removing the effect of the pull-up resistor 202 on port system 200. That is, the pull-up resistor 202 may be connected or disconnected from the output pin 216 of port 118 in response to the bit value programmed in the flash memory 124. In this way, the function of port 118, 120, 122 may be established by the value of the configuration bit programmed into the microprocessor 100 flash memory 124.

As a further example of one exemplary embodiment in accordance with FIG. 2, the switch 208 may close in response to a "1" provided by register 204, thereby completing the circuit between the power source 214 and the pull-up resistor 202. On the other hand, when register 204 provides a "0" signal the switch 208 opens or remains open to disconnect the pull-up resistor 202 from the power source 214, which in turn, removes the effect of the pull-up resistor 202 on the port system 200.

Further, it should be understood that by disconnecting the power source 214 when port 118 is to be connected to a memory device, the overall speed of the microprocessor system 100 is improved, since the absence of the pull-up resistor 202 reduces the propagation time it takes for the bit value stored in the register 204 to propagate to the I/O pin 216. Further, once the power source 214 is disconnected, the power consumption of system 200 is reduced, since the absence of the power source 214 removes the static current flow from the power source 214.

It should be noted that the configuration bit may be provided to computer port 118 in response to a command (e.g., read request) provided to the flash memory 124 by the CPU core 102 via the bus interface 104. On the other hand, the configuration bit may be provided directly to the port 118, from its storage location in the flash memory. Once the configuration bit is provided to port 118, the operational functionality of the port will be determined according to the value of the configuration bit. That is, the value of the configuration bit determines the position of the switch 208 with respect to the power source 214. For example, where the configuration bit is a "1", port 118, 120, 122 may be set to I/O mode and the power source 214 will be connected to the output pin 216 via the pull-up resistor 202. Conversely, where the configuration bit is an "0", the port 118 may be set to memory mode and the power source 214 will be disconnected from the output pin 216.

Figure 3:
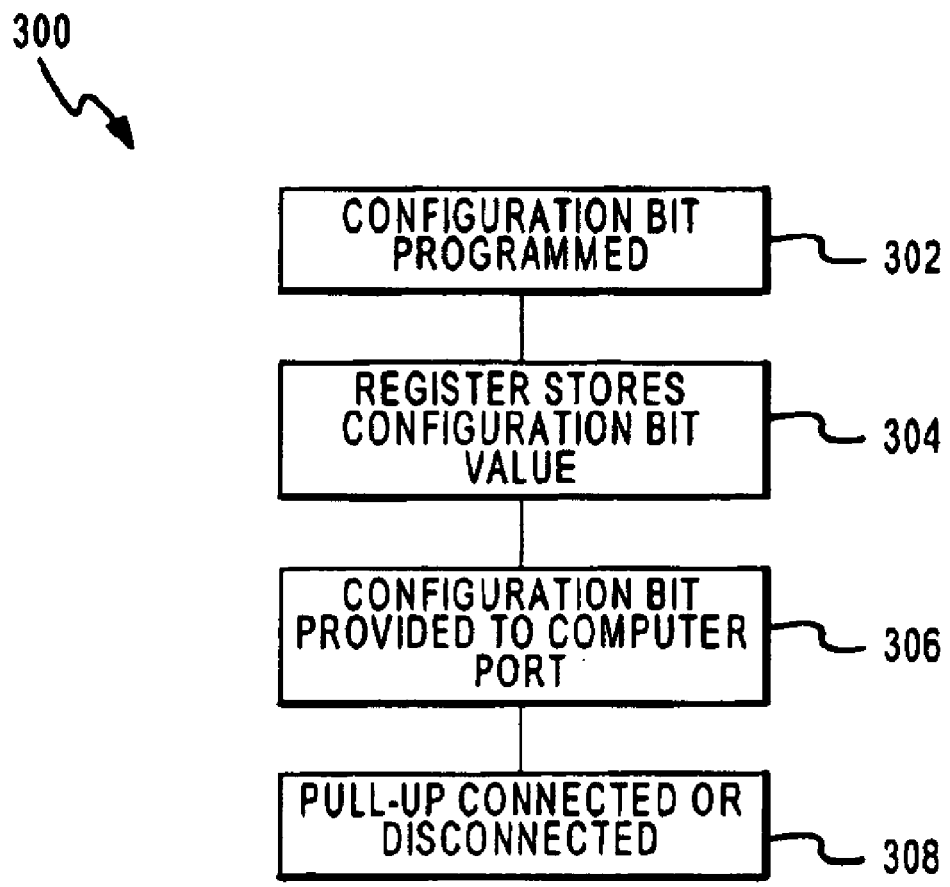
FIG. 3 is a block diagram of an exemplary method in accordance with the present invention.

FIG. 3 illustrates an exemplary method in accordance with the present invention where the operational steps of an exemplary embodiment of the invention is shown. A further understanding of the invention may be had with reference to FIGS. 1–3 as described below. For example, at step 302 the configuration bit is programmed in flash memory 124 for establishing the functionality of computer port 118. In response to the programming of the configuration bit, at step 304, a register 204 may store a value of "1" or "0" as required. At step 306, the configuration bit is provided to the computer port 118 at system power up or system reset. In accordance with the value of the configuration bit, the switch 208 may open or close which disconnects or connects the power source 214 to or from the output pin 216, at step 308. This, in turn, establishes the functionality of the computer port 118 as an I/O port, a port for use with a memory device, or any such functionality for which computer port 118 may be used.

In accordance with the present invention, the propagation time from the register 204 through the tri-state buffer 210 to the output pin 216 may depend on the value of the pull-up resistor 202 and the capacitance of the down stream device connected to the exemplary port arrangement 200. The greater the value of the pull-up resistor 202 the longer the propagation time of the signal from the register 204 to the output pin 216. Consequently, by removing the pull-up resistor 202 from the port arrangement 200 (e.g., opening the switch 208), the propagation time of the signal is reduced.

Further, as should be understood, where switch 208 is closed, there exist some static current flow from the power source 214 to the output pin 216. By removing the power source 214 from the port arrangement 200 (e.g., opening the switch), the affect of the static current on the port arrangement 200 may be eliminated. As previously noted, since the overall power consumption of the port arrangement 200 is proportional to the current in the system, then the open switch configuration consumes less power.

The present invention has been described above with reference to an exemplary embodiment. However, those skilled in the art will recognize that changes and modifications may be made to the exemplary embodiment without departing from the scope of the present invention. For example, the various components may be implemented in alternate ways, such as varying or alternating the steps in different orders. These alternatives can be suitably selected depending upon the particular application or in consideration of any number of factors associated with the operation of the system. In addition, the techniques described herein may be extended or modified for use with other types of devices, in addition to the microprocessor or to any other master or slave devices. For example, it should be understood that the present invention is suitable for use in switching technologies in computer networks. These and other changes or modifications are intended to be included within the scope of the present invention.

What is claimed is:

1. A microprocessor system comprising:
   a computer port;
   a programmed configuration bit for programming functionality of said computer port wherein said programmed configuration bit configures said computer port to be one of a memory mode and a register mode; and a flash memory for storing said programmed configuration bit and providing said programmed configuration bit to said computer port, wherein said programmed configuration bit configures said computer port to be one of a memory mode and a register mode.

2. A system according to claim 1 wherein, said configuration bit is provided to said flash memory upon system power up.

3. A system according to claim 1 wherein, said configuration bit is provided to said flash memory upon system reset.

4. A microprocessor system comprising:

a computer port;

a programmed configuration bit for programming functionality of said computer port;

a bus interface for providing a processing command; and a flash memory for storing said configuration bit, said flash memory configured to receive said processing command and provide said configuration bit to said computer port in response to said processing command, and wherein said programmed configuration bit configures said computer port to be one of a memory mode and a register mode.

5. A system according to claim 4 wherein, said configuration bit is provided to said computer port upon system power up.

6. A system according to claim 4 wherein, said configuration bit is provided to said computer port upon system reset.

* * * * *